United States Patent
DeLuca (10) Patent No.: US 9,234,760 B2
(45) Date of Patent: Jan. 12, 2016

(54) PORTABLE MOBILE TRANSCEIVER FOR GPS NAVIGATION AND VEHICLE DATA INPUT FOR DEAD RECKONING MODE

(75) Inventor: Michael Joseph DeLuca, Boca Raton, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 705 days.

(21) Appl. No.: 12/696,768

(22) Filed: Jan. 29, 2010

(65) Prior Publication Data
US 2011/0191024 A1    Aug. 4, 2011

(51) Int. Cl.
| G01C 21/16 | (2006.01) |
| G01C 21/30 | (2006.01) |
| G01S 19/49 | (2010.01) |
| G01C 21/28 | (2006.01) |

(52) U.S. Cl.
CPC .............. *G01C 21/28* (2013.01); *G01C 21/165* (2013.01); *G01S 19/49* (2013.01); *G01C 21/30* (2013.01)

(58) Field of Classification Search
USPC .................................. 701/472, 501
See application file for complete search history.

(56) References Cited

U.S. PATENT DOCUMENTS

| 4,999,783 | A | * | 3/1991 | Tenmoku et al. ............. 701/445 |
| 5,058,023 | A | * | 10/1991 | Kozikaro ...................... 701/494 |
| 5,278,424 | A | * | 1/1994 | Kagawa ................... 250/559.37 |
| 5,334,986 | A | * | 8/1994 | Fernhout ................... 342/357.31 |
| 5,459,667 | A | * | 10/1995 | Odagaki et al. ............... 701/428 |
| 5,828,585 | A | | 10/1998 | Welk |
| 5,852,791 | A | * | 12/1998 | Sato et al. ..................... 701/446 |
| 5,922,042 | A | * | 7/1999 | Sekine et al. ................. 701/418 |
| 5,961,571 | A | * | 10/1999 | Gorr et al. ..................... 701/494 |
| 5,987,381 | A | * | 11/1999 | Oshizawa ...................... 701/427 |
| 6,226,591 | B1 | * | 5/2001 | Okumura et al. ............. 701/409 |
| 6,360,165 | B1 | * | 3/2002 | Chowdhary .................. 701/495 |
| 6,597,987 | B1 | * | 7/2003 | Barton .......................... 701/446 |
| 6,622,087 | B2 | * | 9/2003 | Anderson ..................... 701/423 |
| 6,801,855 | B1 | | 10/2004 | Walters et al. |

(Continued)

FOREIGN PATENT DOCUMENTS

| DE | 102006054346 A1 | * | 5/2008 | ............. G01C 21/28 |
| EP | 199266 A1 | * | 10/1986 | ............... H04Q 7/04 |

(Continued)

OTHER PUBLICATIONS

Extended European Search report mailed Nov. 18, 2010. In corresponding European patent application No. 10169740.7.

(Continued)

*Primary Examiner* — Shelley Chen
(74) *Attorney, Agent, or Firm* — Fish & Richardson P.C.

(57) ABSTRACT

A mobile transceiver device comprises a GPS receiver module to receive GPS signals and calculate current positions. The current positions are used in a navigation module. The mobile transceiver device comprises one or more local interface technologies, such as Bluetooth and USB. These local interface technologies can be used to communicate with an automobile data system. In situations where there is sporadic GPS coverage, the mobile transceiver device receives inputs from the automobile data system, such as speed or velocity information, and heading information, such as output from a compass, as available. These inputs are used in the navigation module of the mobile transceiver device to navigate by dead reckoning until an updated position fix based on received GPS signals can be calculated.

17 Claims, 6 Drawing Sheets

(56) References Cited

U.S. PATENT DOCUMENTS

| | | | |
|---|---|---|---|
| 6,845,362 B2* | 1/2005 | Furuta et al. | 705/13 |
| 7,483,789 B1 | 1/2009 | Walters et al. | |
| 7,840,326 B1* | 11/2010 | Yamada | 701/49 |
| 2002/0049538 A1 | 4/2002 | Knapton | |
| 2002/0049630 A1* | 4/2002 | Furuta et al. | 705/13 |
| 2002/0082771 A1* | 6/2002 | Anderson | 701/209 |
| 2003/0158799 A1* | 8/2003 | Kakihara et al. | 705/30 |
| 2006/0271295 A1* | 11/2006 | McLaren et al. | 701/216 |
| 2007/0021912 A1* | 1/2007 | Morita et al. | 701/211 |
| 2007/0250263 A1* | 10/2007 | Yamada | 701/207 |
| 2008/0091347 A1* | 4/2008 | Tashiro | 701/210 |
| 2008/0139183 A1* | 6/2008 | Keohane et al. | 455/414.1 |
| 2008/0234924 A1* | 9/2008 | Katou | 701/200 |
| 2009/0005070 A1 | 1/2009 | Forstall et al. | |
| 2009/0005965 A1 | 1/2009 | Forstall et al. | |
| 2009/0005972 A1 | 1/2009 | de Koning | |
| 2009/0005975 A1 | 1/2009 | Forstall et al. | |
| 2009/0018772 A1* | 1/2009 | Watanabe et al. | 701/214 |
| 2009/0063051 A1* | 3/2009 | Watanabe et al. | 701/216 |
| 2009/0265070 A1* | 10/2009 | Okada et al. | 701/70 |
| 2010/0004849 A1* | 1/2010 | Jeong | 701/200 |
| 2010/0169010 A1* | 7/2010 | Jeong | 701/209 |
| 2010/0286896 A1* | 11/2010 | Yamada | 701/117 |
| 2010/0305844 A1* | 12/2010 | Choi et al. | 701/201 |
| 2011/0039581 A1* | 2/2011 | Cai et al. | 455/456.4 |

FOREIGN PATENT DOCUMENTS

| | | | |
|---|---|---|---|
| FR | 2931285 A1 * | 11/2009 | G01C 21/26 |
| WO | 2009073806 A2 | 6/2009 | |

OTHER PUBLICATIONS

English Abstract for DE102006054346, published May 21, 2008.

Dead reckoning has been shown using accelerometers for portable devices or vehicle speed sensors. http://www.roadmapgps.com/glossary/dead-reckoning.shtml. Retrieved on May 7, 2012.

Mio A702 GPS Smartphone Incorporates SiRFDiRect Dead Reckoning Technology. http://gpstekreviews.com/2007/06/20/mio-a702-gps-smartphoneincorporates-sirfdirect-dead-reckoning-technology/. Retrieved on May 7, 2012.

The Application of Integrated GPS and Dead Reckoning Positioning in Automotive Intelligent Navigation System. http://www.gmat.unsw.edu.au/wang/jgps/v3n12/v3n12p23.pdf. Retrieved on Nov. 15, 2004.

Examination report mailed Jun. 15, 2012, in corresponding European patent application No. 10169740.7.

Office action mailed Dec. 13, 2012, in corresponding Canadian patent application No. 2,729,410.

Office Action mailed Oct. 3, 2013, in corresponding Canadian patent application No. 2,729,410.

Office Action mailed Jul. 25, 2014; in corresponding Canadian patent application No. 2,729,410.

Summons to attend oral proceedings pursuant to Rule 115(1)EPC mailed Jul. 10, 2014; in corresponding European patent application No. 10169740.7.

* cited by examiner

PORTABLE MOBILE TRANSCEIVER FOR GPS NAVIGATION AND VEHICLE DATA INPUT FOR DEAD RECKONING MODE

BACKGROUND

1. Field

The following relates to data-enabled mobile transceiver devices, such as data-enabled mobile phones, digital assistants, and smartphones, and more particularly to using these devices for navigation based on received satellite signals, such as Global Positioning System (GPS) signals, and dead reckoning techniques, at times when GPS signals are unavailable.

2. Related Art

Portable communication devices, such as mobile phones, increasingly have GPS receivers built-in. The devices can use received GPS signals to determine a current position of the mobile device, and in turn use that current position information as input for navigation applications. GPS signals are not always reliably received by a mobile device, such that a mobile device cannot always obtain a positional fix when desired, such as when using a navigation application on the mobile device while driving an automobile. In particular, it is known that tall objects, such as buildings and trees obstruct GPS signal reception. However, it remains desirable to be able to continue to provide position information and navigation assistance even when the device cannot receive GPS signals adequate to determine a position of the device.

BRIEF DESCRIPTION OF THE DRAWINGS

In order to more fully explain describe various aspects, examples, and inventive embodiments, the following figures are provided, in which.

DETAILED DESCRIPTION

The following description provides examples and other disclosure, which teach those of ordinary skill in the art how to practice implementations and embodiments of inventive aspects described herein. As such, the description is not limiting, but rather is exemplary.

For convenience, in this description, the term "mobile transceiver device" (shorted in "device") is generally used to refer to any portable or mobile network-enabled device that has capabilities to send and receive data, such as data generated by web browsing, e-mail, SMS, instant messaging, and the like. As will become clear, a variety of devices in a variety of form factors can meet such a definition, including, for example, smartphones, laptops configured with appropriate network connections and user input devices, tablet computers, and netbooks.

Determining a physical position of an object should be understood to require using one or more data inputs, and using those inputs in appropriate calculations to estimate a physical position. Thus, a determination of a physical position involves degrees of uncertainty, imprecision and inaccuracy. In disclosed examples, two kinds of position determination are used (1) determining a physical position based on received GPS signals and (2) using dead reckoning to determine a physical position.

Dead reckoning navigation involves beginning from a given position and as time elapses during movement, estimating a current location based on speed and, in some cases, heading information, and potentially other information. When available, using GPS signals would be expected generally to yield better position information than dead reckoning position estimation.

For ease of explanation, this description refers to estimating and determining positions, but it would be understood by a person of ordinary skill in the art that all methods and apparatuses cannot determine an absolutely precise physical position, and thus determining should be understood in that context to mean determining a position within a the degree of accuracy provided by the method or apparatus being used in that positional determination.

Starting points for dead reckoning herein may be a GPS position, a user-entered position, or a position previously estimated by dead reckoning. A combination of such inputs also can be supported. Embodiments (e.g., devices) according to one example can use a last-determined position, such as a GPS position, as a starting point for dead reckoning navigation, and obtain inputs from an automobile data system, in which the device is located, for use in that dead reckoning navigation. In some embodiments, a dynamic switching can occur between using GPS-determined positions and dead reckoning based on inputs from the automobile data system. For example, GPS signals may be sporadically available, and between that sporadic availability, dead reckoning is used in positional estimation. When GPS signals are again available, the positional estimate can be corrected or refined based on those GPS signals.

For clarity, a GPS position produced by a GPS receiver module, or a functional module that receives GPS signals can be called a calculated, or determined position, while a position produced at least in part using dead reckoning information can be called an estimated position.

Further, although the term Global Positioning System (GPS) is used in describing signals, functional modules, systems, and so on in this description, it would be understood that the description is not limited to use of GPS, per se. Rather, GPS serves as an example of a technology for determining or calculating a position based on received satellite signals. Technologies other than GPS can provide such signals, and can be used in embodiments according to this disclosure. For example, Galileo (EU), GLONASS (Russia), and COMPASS (China) are all examples of systems that are under development or otherwise contemplated that can be used in embodiments according to these disclosures. In this disclosure and appended claims, the term GPS encompasses such systems and equivalent systems.

Figure 1:
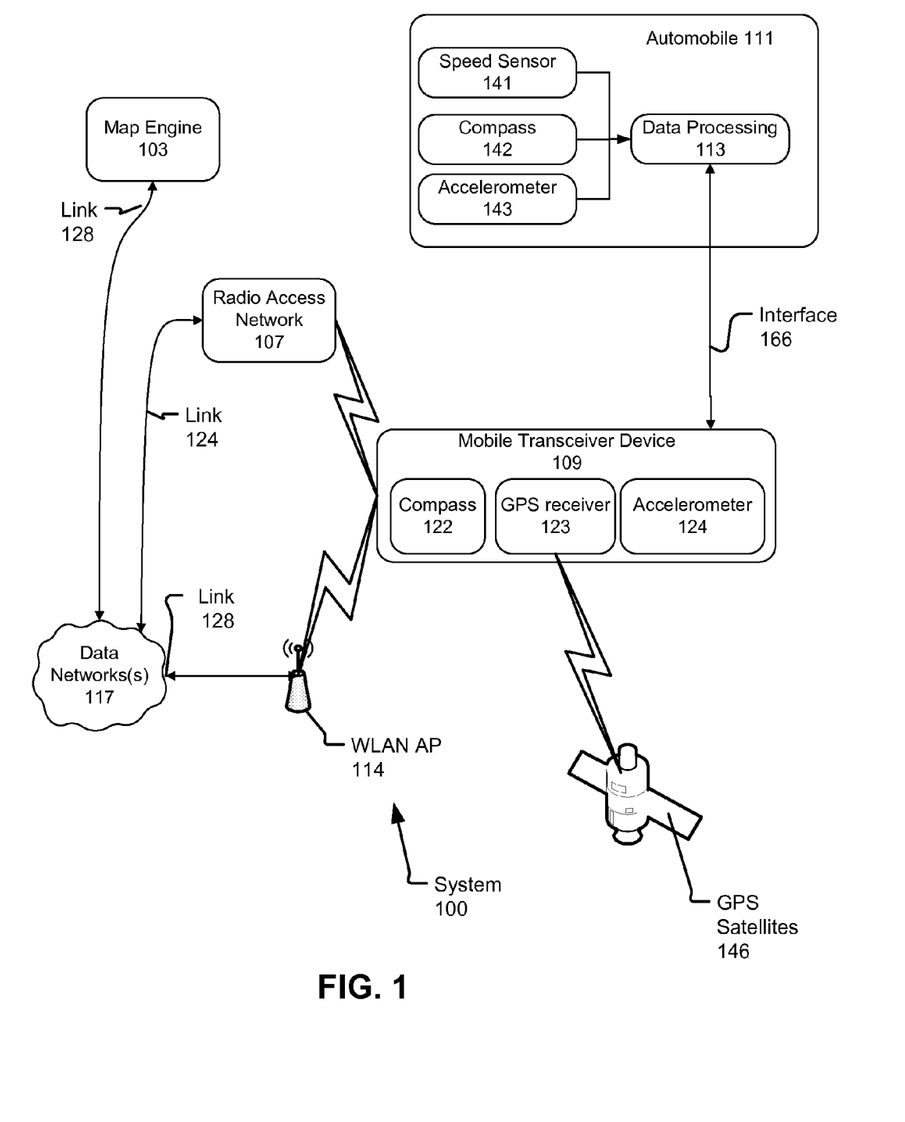
FIG. 1 depicts example components of an arrangement in which a mobile transceiver device can receive inputs from an automobile data system for use in dead reckoning navigation.

As an example, FIG. 1 depicts a system architecture 100 in which a data-enabled mobile transceiver device 109 (device 109, hereinafter) can communicate with data processing logic 113 provided in an automobile 111 over an interface 166.

In one example, a broadcast radio receiver can be located or installed in an automobile 111, and data processing logic 113 can be implemented at least partially using the broadcast radio receiver, which can receive inputs from one or more sensors or other data sources in automobile 111, including a speed sensor 141, a compass 142 that allows determination of a heading based on magnetic north, and an accelerometer 143. For example, data processing logic 113 can represent portions of a vehicle entertainment, navigation system, and a vehicle engine control system. An engine control system can provide outputs to the entertainment system or navigation system, which in turn can implement interface 166 to transfer that data to device 109. Interface 166 also can be implemented using an on-board-diagnostics (OBD) connection.

Device 109 also can include modules comprising a compass module 122, which allows determination of a heading based on magnetic north, a GPS receiver 123, and an accelerometer 124, which can detect acceleration along one or more axes. GPS receiver 123 can receive GPS signals from a constellation of GPS satellites 146.

Device 109 can communicate using a plurality of different wireless data communication protocols and standards. For example, device 109 can communicate over a radio access network (RAN) 107, which can be, for example, a cellular network. Examples of technologies that can be used for implementing RAN 107 include EDGE, UMTS, LTO, EVDO, GPRS, and other technologies for providing data transmit and receive capability to mobile devices. These technologies are used by example and such examples are not exhaustive, as embodiments of these examples do not depend on any particular characteristics or capabilities of such RAN 107.

Device 109 also can communicate with Local Area Network (LAN) wireless access points, such as WLAN AP 114. Technologies that can be used in providing such wireless LAN access include equipment based on the 802.11 series of IEEE standards. WLAN AP 114 can communicate over a link 128 with a data network 117.

Data network 117 can be implemented using the Internet, or more generally any collection of one or more networks that allow data communication among elements depicted in system 100.

The communication links depicted can be implemented using public and/or private networks that can communicate using packet data technologies, such as X.25 or Internet Protocol (IP) based addressing and routing techniques. Some connections can be implemented as secure connections over leased lines, such as a frame relay, or using Virtual Private Network (VPN) technologies.

Interface 166 can be implemented, for example, using one or more local communication links, such as a Universal Serial Bus (USB) port, and a Bluetooth link, which can operate according to an extension of existing Microsoft® Sync® technology. Currently, Sync provides a capability for a mobile transceiver device to send data to a computer system embedded in certain automobiles (such as automobile 111), and can use Bluetooth as a physical link. Sync can be used as a logical link connection to send the described metadata from the embedded computer system to device 109. Further explanation of the functioning of system 100 and methods for such are described below.

Figure 2:
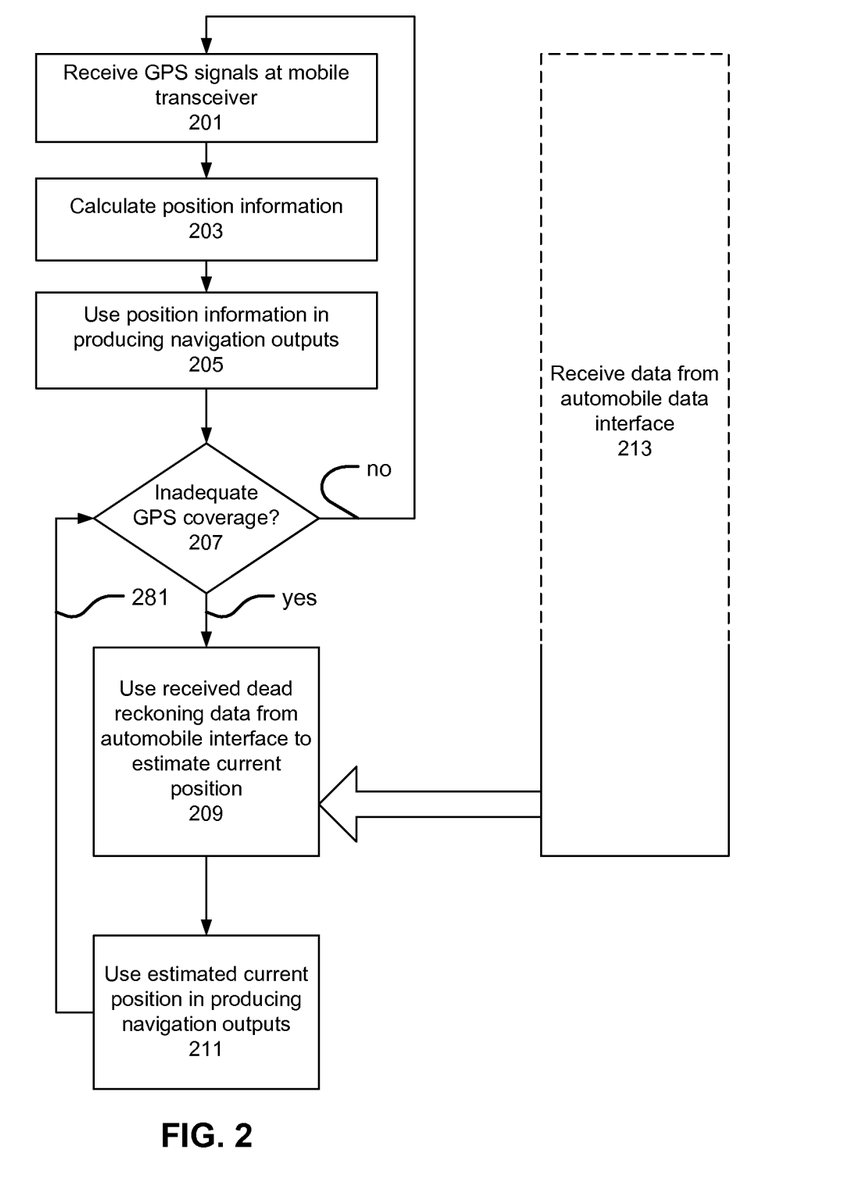
FIG. 2 depicts an example method for using GPS and the dead reckoning inputs from the automobile data system in navigation.

FIG. 2 depicts a first example method that can be performed by device 109 in producing a navigation output, which can be used in a navigation application, or presented through a user interface (e.g., a display) of device 109. GPS signals can be received (201) by mobile transceiver device 109 (device 109). Based on the received GPS signals, position information can be calculated (203), which can include a physical position of device 109. The calculated positional information can be used in producing (205) a navigation output. The produced navigation output may comprise a display of a position of the device on a display of device 109, as well as using the position information in determining whether the device remains on a pre-determined route, and for other navigation purposes.

Thus, the flow of the method through receiving, calculating positional information and using the positional information in producing a navigation output represents a normal situation where adequate GPS signal coverage is available at the device's location, and the device is able to use that signals in determining a position, which can then be used for a variety of purposes. Sometimes however, device 109 may not be able to receive sufficient GPS signals in order to calculate a position, or the signals received may not be of sufficient strength and consistency in order to calculate a position with enough accuracy. For example, device 109 may be shielded by buildings, trees, or geographical features from being able to receive adequate GPS signals when a position is desired to be calculated.

Such circumstances are depicted in FIG. 2 by a decision of determining (207) whether there is adequate GPS coverage to obtain a GPS positional fix with enough accuracy to be used as a sole basis for a positional determination for use or output. Thus, adequate coverage can be a device designer decision, in that some designers may have laxer or more restrictive requirements for such accuracy. Also, in embodiments of examples presented in this disclosure, what is inadequate coverage can be influenced by the design of device 109, what kind of antenna used, electromagnetic noise, as well as programming provided in device 109. Thus, some devices may be able to use weaker signals than other devices, and what is inadequate coverage thus can vary among devices.

Where determining (207) shows that there is adequate GPS signal coverage, the depicted method iterates to again use received GPS signals in calculating an updated position for device 109. For example, as device 109 moves with automobile 111, device 109 may update a display of the GPS-calculated position on an approximately regular interval.

Upon determining that there is inadequate GPS coverage, dead reckoning input data received (213) from an automobile data interface is used either to supplement or in substitution for the GPS-signal based position, for determining (209) an updated position of device 109.

Such dead reckoning input can comprise speed information for an interval or intervals of time. For example, data processing 113 functionality may provide an average speed for a just-completed time interval, or an instantaneous speed at regular intervals. Where average speed information is provided, the interval can be longer, while if instantaneous speed information is provided, then the interval preferably is made shorter.

The speed information can be used with interval duration information in estimating a distance traveled since the last position update. For average speed, the interval can be multiplied by average speed in order to approximate distance traveled. For instantaneous speed, device 109 can take an average of two speed values, or fit a curve to a series of instantaneous speed values, or otherwise develop an average speed value or speed value curve for that interval. That speed information can then be piece-wise or continuously multiplied with time information to obtain estimates of distance traveled. For convenience, such process can be termed integration of the speed over the time interval, but it would be understood that any approach to determining distance based on elapsed time and speed information can be used, and integration is not used here to imply a strict mathematical definition.

Returning to interval duration selection, duration of the intervals can be pre-defined, selected by device 109 or data processing 113, or determined in a negotiation process. For example, the average speed may be provided for time segments of duration about 0.1, 0.5, 1, 2, 3, 4, 5, or more seconds, or a time segment duration between about a selection of these values.

The time segment duration can be speed-dependent, such as becoming shorter as speed increases. A speed of one mile per hour translates into about 1.5 feet per second. Traveling at 30-45 miles per hour translates into traveling about 44-66 feet per second. Therefore, a 0.1 second interval would provide an update for about every 4-7 feet, which may be more frequent than necessary. However, a one-second interval may not provide sufficient granularity to be able to update a position. For example, traveling on an urban street, a 20 or 30 foot discrepancy can be significant, while on an open highway, 20 or 30 feet may not be.

The data received form data processing 113 can also include other data available from other sensors or functions providing data to data processing 113. Such sensors or functions can include magnetic compass 141 and accelerometer 143. Heading information from data processing 113 can be used in conjunction with speed information (effectively providing velocity information). Also, accelerometer 143 can be used in more sophisticated distance estimation algorithms that can use that acceleration information for more accurate estimation and prediction of position.

For example, sensed speed information may have a lag between when it is gathered by data processing 113, received in device 109, processed and used to generate a navigation output. That lag can be affected by an averaging filter applied to the speed values, and the parameters of that filter. The speed of processing of the system also can affect that lag (i.e., there can be intentional delay and delay inherent in the system). These delays can vary, causing jitter. Having acceleration information available can allow device 109 to predict where device 109 actually is, accounting for such delays. For example, in a hard deceleration, using only speed information gathered at the start of such deceleration would cause overestimation of distance traveled, but with an instantaneous acceleration sample, the estimate can be made more accurate by predicting or modeling the decrease in speed until a next speed sample is available.

FIG. 2 depicts that dead reckoning data can be received from data processing 113 even when GPS signals are adequate. That data can be ignored if desired, or a certain amount of previously-received information can be retained, to account for filtering and other delays. For example, if a smoothing filter is applied, preferably, device 109 would not require reception of several intervals of dead reckoning data to fill that filter after there is loss of GPS signals; rather that data preferably is always available. Dead reckoning information also can be used in checking whether a calculated GPS position is reasonable, when there is spotty GPS coverage.

Following the estimation of position (209), FIG. 2 depicts that the method can produce (211) a navigation output that is based on the estimated position. For example, a current position of device 109 on a display can be updated, time to arrive estimates can be changed, turn announcement determinations can be run, and so on.

Figure 3:
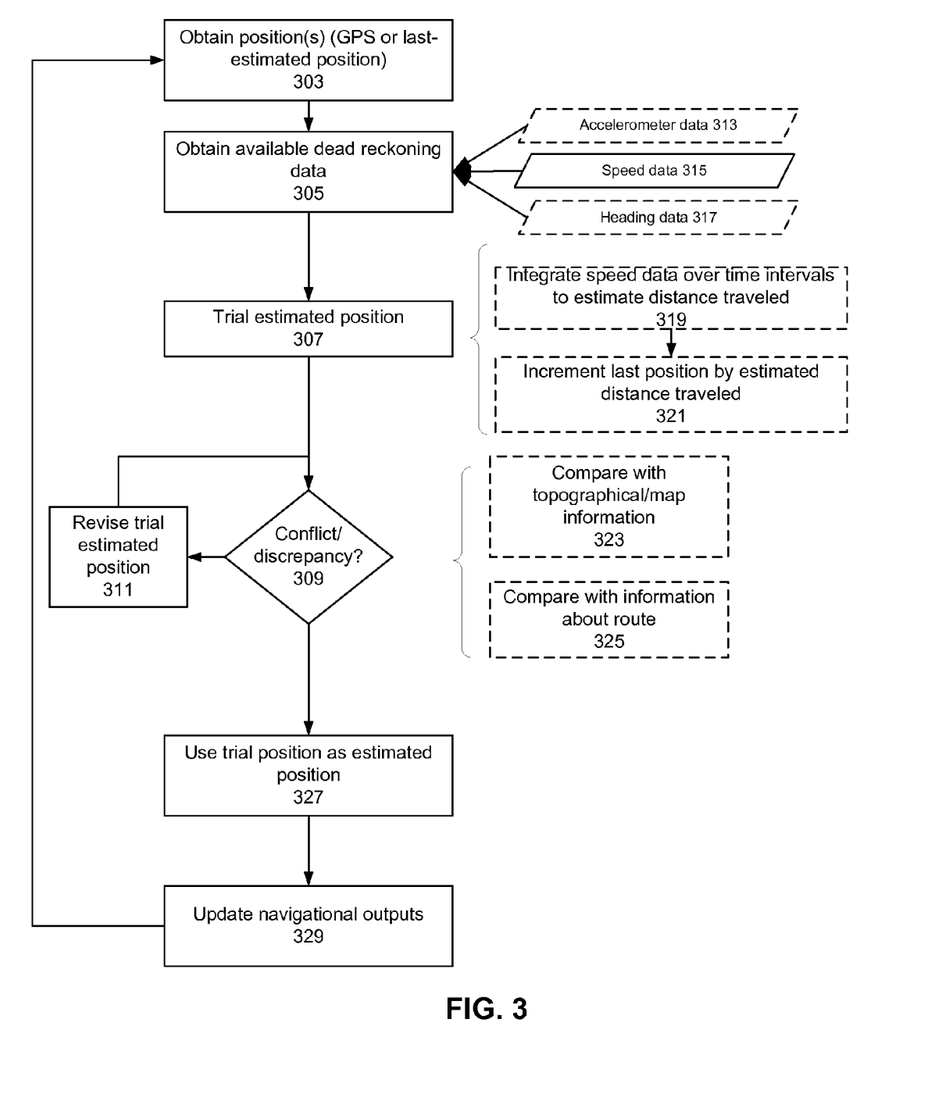
FIG. 3 depicts another example method in which inputs from an automobile data system can be used in dead reckoning navigation.

FIG. 3 depicts another example method that can be performed in device 109. The example method depicted in FIG. 3 obtains (303) one or more positions that were determined based on GPS signals or based on a last-estimated position. Dead reckoning data is obtained (305); such data is represented by accelerometer data 313, speed data 315 and heading data 317. Dashed lines for accelerometer data 313 and heading data 317 represent that such data is optional; however, speed data preferably is available.

A trial estimated position is calculated (307), and such calculation can include integrating (319) speed data over time intervals, as described above and incrementing (321) a last position (either GPS calculated or dead-reckoning input based).

A check can be performed to determine whether there is any evidence that the trial estimated position conflicts with other available data. For example, the method can use map data (e.g., topographical map data) to determine whether the trial estimated position is in an inaccessible place. For example, if the trial estimated position is off of any known road, or on a median, or hillside, and so on, then the trial estimated position is unlikely to be accurate. Where available, the trial estimated position also can be compared (325) with route information. If a conflict or other discrepancy is identified, then a revised (311) trial estimated position can be made. That trial position can be checked (309) again for conflict. For example, if an original trial position was off the road, then the revised position can be put back on the road. If the revised position is on a road that would have involved a turn from a known route, then a different street may be selected.

Eventually, a trial position for which a conflict is not found can be used (327) as the estimated position and navigational outputs can be updated (329) using that estimated position.

Figure 4:
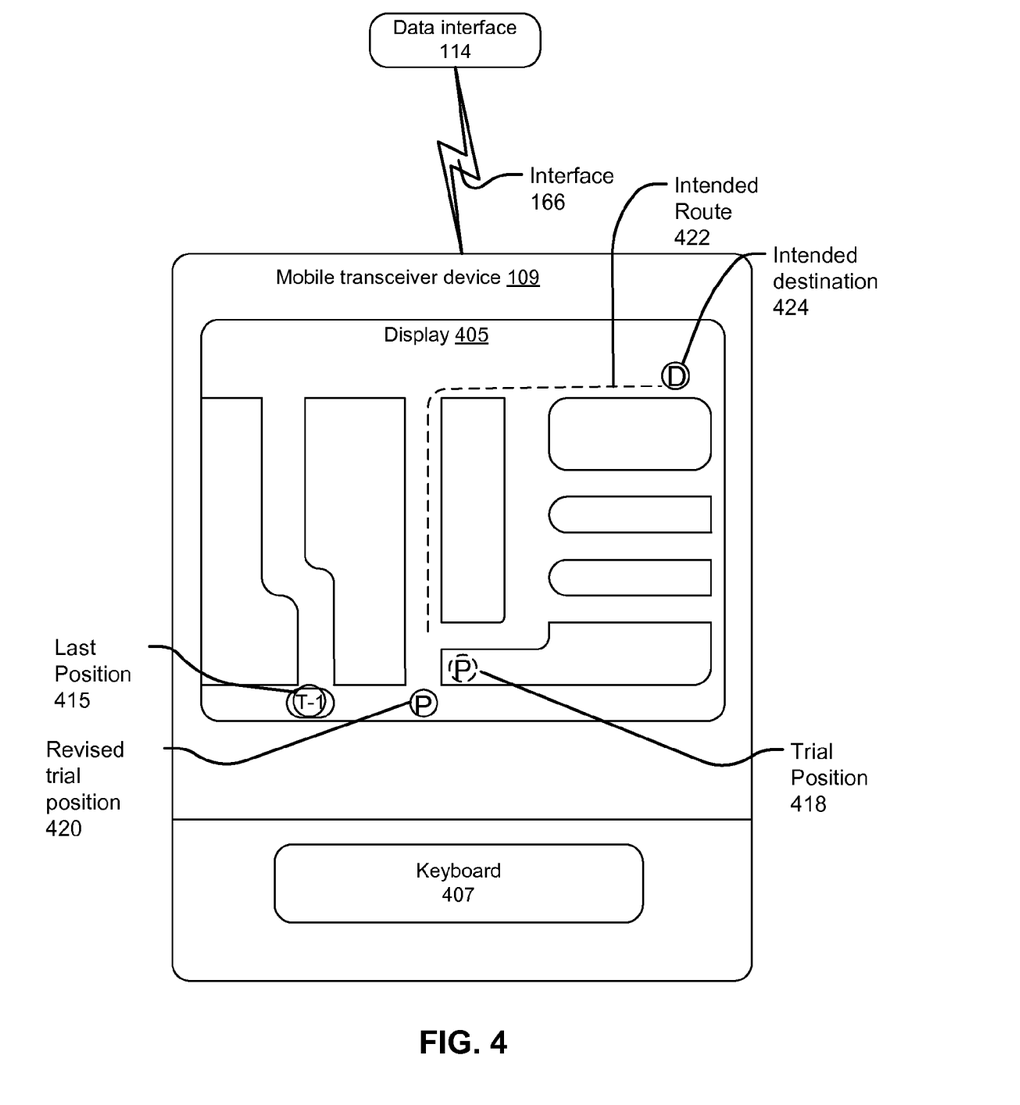
FIG. 4 depicts a display of a device which can function according to the example methods depicted and described.

FIG. 4 depicts an example user interface for device 109, which comprises a display 405 and a keyboard area 407. A last position 415 is shown as (which may not actually be displayed, but can be represented internally and used for calculating estimated positions, as described above). A trial estimated position 418 is first calculated based on dead reckoning inputs received from automobile data processing 113. However, a validity (conflict check—see FIG. 3, 309) determines that the position is not on a road, and so a revised trial position 420 can be determined, and used as the estimated position absent other conflicts. An intended destination 424 can be displayed as well, and used as appropriate in conflict checking, as described with respect to FIG. 3.

Figure 5:
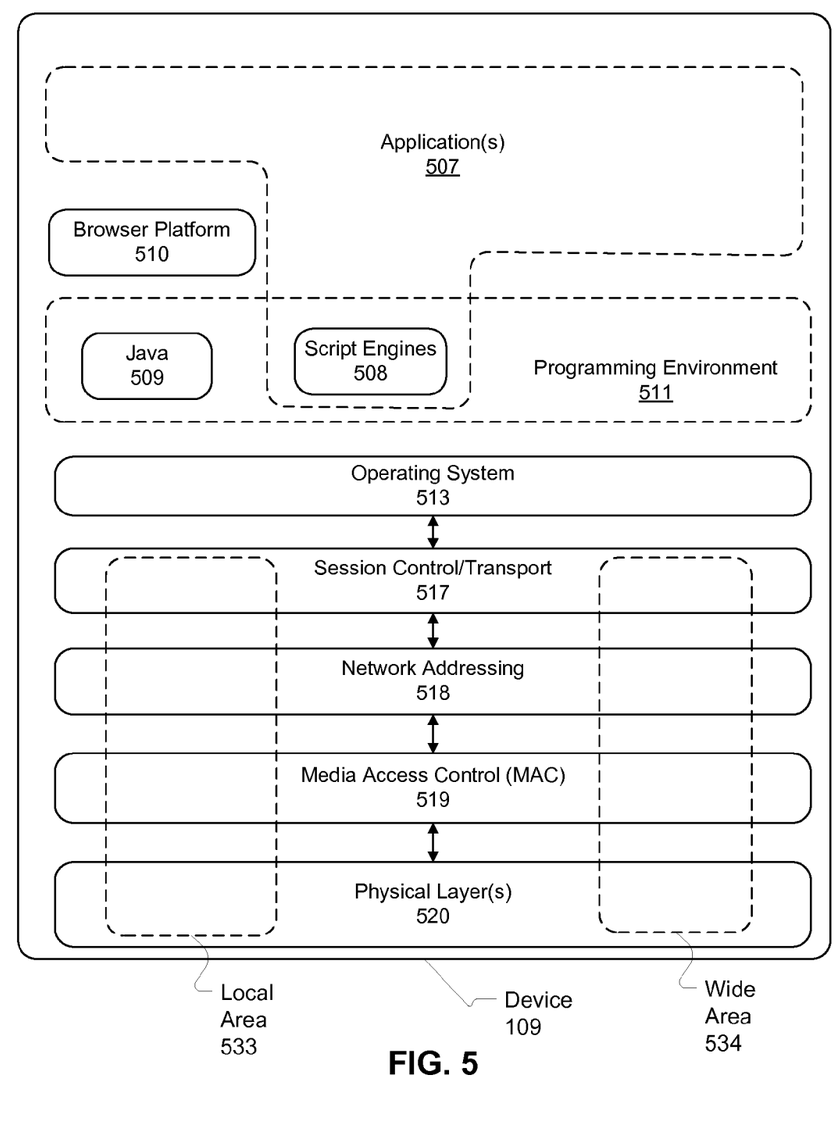
FIG. 5 depicts a functional module view of a mobile transceiver device that can be used in the FIG. 1 system.

FIG. 5 depicts an example functional arrangement for an embodiment of device 109. According to FIG. 5, device 109 can comprise a local area network 533 and wide area network 534 capabilities. To implement these capabilities, FIG. 5 depicts that device 109 comprises one or more physical layers 520, which communicate with one or more Media Access Control (MAC) functions (519) appropriate for the physical media. For example, MAC algorithms for a local area wireless technology such as 802.11 desirably are different from a MAC for a cellular wireless technology and from a wired local area network. Respective MAC layers communicate with a network addressing layer (518). Network addressing can be common between different networks, for example Internet Protocol (IP) addressing can be used over 802.11 type wireless LANs, Bluetooth, and cellular wireless. Network address 518 communicates with a session control/transport layer (517); common transport protocols include TCP (Transport Control Protocol) and User Datagram Protocol (UDP), both of which can be used with IP addressing. An operating system 513 can communicate with the session control/transport (517) functions, on behalf of applications. The logical division depicted here is for explanation purposes and some embodiments can provide an operating system that comprises session control/transport 517 and network addressing 518 functionality.

Operating system 513 provides a platform on which applications can be developed. A programming environment 511 can be provided as part of operating system 513 or as an additional middle ware layer to which applications can be developed. For example, programming environment 511 can comprise a set of script engines 508, and a java 509 implementation. Script engines 508 comprise interpreters for scripting languages in which scripts to accomplish tasks can be written. Java 509 can provide a set of pre-defined routines and other functions that can be called by an application. A browser platform 510 can be written to use the script engines 508 and Java 509 implementation. Browser platform 510 can comprise markup and script language renderers. Browser platform 510 may install Java 509 and script engines 508, which it will use. Applications 507 can be written to use browser platform 510, Java 509, script engines 508, as well as other functions provided by operating system 513. Applications 507 can be written to use programming interfaces provided by these elements, such as using published procedure names and passing appropriate arguments when calling such procedures. Applications also can inter-operate and exchange information, either using operating system 513 or by another programming model.

One application that can be provided in such a device is an application that performs according to the Microsoft Sync model, except that the application is extended to allow communication from data processing 113 to the application running on the device, rather than only allowing communication from the device to the built-in computer, as presently is the case. Another application that can be provided for use in the device depicted in FIG. 5 is an application that processes metadata from a broadcast receiver according to the examples described above.

Figure 6:
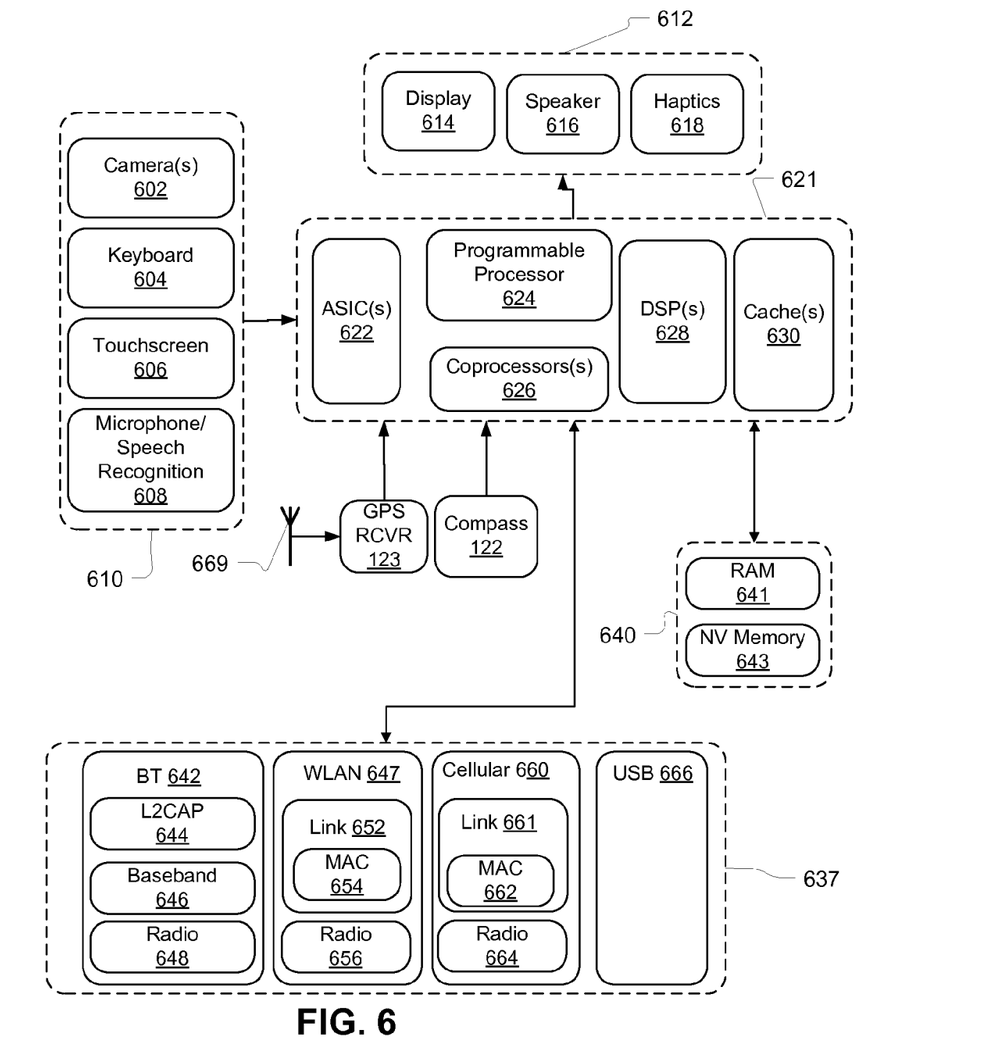
FIG. 6 depicts example functional blocks of a mobile transceiver device, which can be used in implementing embodiments according to the presented examples.

FIG. 6 depicts example components that can be used in implementing a mobile transceiver device 109 according to the above description. FIG. 6 depicts that a processing module 621 may be composed of a plurality of different processing elements, including one or more ASICs 622, a programmable processor 624, one or more co-processors 626, which each can be fixed function, reconfigurable or programmable, one or more digital signal processors 628. For example, an ASIC or co-processor may be provided for implementing graphics functionality, encryption and decryption, audio filtering, and other such functions that often involve many repetitive, math-intensive steps. Processing module 621 can comprise memory to be used during processing, such as one or more cache memories 630.

Processing module 621 communicates with mass storage 640, which can be composed of a Random Access Memory 641 and of non-volatile memory 643. Non-volatile memory 643 can be implemented with one or more of Flash memory, PROM, EPROM, and so on. Non-volatile memory 643 can be implemented as flash memory, ferromagnetic, phase-change memory, and other non-volatile memory technologies. Non-volatile memory 643 also can store programs, device state, various user information, one or more operating systems, device configuration data, and other data that may need to be accessed persistently.

User input interface 610 can comprise a plurality of different sources of user input, such as a camera 602, a keyboard 604, a touchscreen 606, and a microphone, which can provide input to speech recognition functionality 608. Processing module 621 also can receive input from a GPS receiver 668, which processes signals received from antenna 669. Processing module 621 also can use a variety of network communication protocols, grouped for description purposes here into a communication module 637, which can include a Bluetooth communication stack 642, which comprises a L2CAP layer 644, a baseband 646 and a radio 648. Communications module 637 also can comprise a Wireless Local Area Network (647) interface, which comprises a link layer 652 with a MAC 654, and a radio 656. Communications module 637 also can comprise a cellular broadband data network interface 650, which in turn comprises a link layer 661, with MAC 662. Cellular interface 650 also can comprise a radio for an appropriate frequency spectrum 664. Communications module 637 also can comprise a USB interface 666, to provide wired data communication capability. Other wireless and wired communication technologies also can be provided, and this description is exemplary.

In addition, separate boxes or illustrated separation of functional elements of illustrated systems does not necessarily require physical separation of such functions, as communications between such elements can occur by way of messaging, function calls, shared memory space, and so on, without any such physical separation. As such, functions need not be implemented in physically or logically separated platforms, although they are illustrated separately for ease of explanation herein.

For example, different embodiments of devices can provide some functions in an operating system installation that are provided at an application layer or in a middle layer in other devices. Different devices can have different designs, such that while some devices implement some functions in fixed function hardware, other devices can implement such functions in a programmable processor with code obtained from a computer readable medium.

Further, some aspects may be disclosed with respect to only certain examples. However, such disclosures are not to be implied as requiring that such aspects be used only in embodiments according to such examples.

More generally, a person of ordinary skill would be able to adapt these disclosures to implementations of any of a variety of communication devices. Similarly, a person of ordinary skill would be able to use these disclosures to produce implementations and embodiments on different physical platforms or form factors without deviating from the scope of the claims and their equivalents.

I claim:

1. A method for implementation on a mobile transceiver device, comprising:
   determining a position of a mobile transceiver device based on received GPS signals;
   detecting, at the mobile transceiver device, inadequacy of a received GPS signal to update the position of the mobile transceiver device;
   wirelessly receiving, at the mobile transceiver device from a vehicle in which the mobile transceiver device is located, dead reckoning inputs, wherein the dead reckoning inputs include speed data, accelerometer data, and heading data of the vehicle;
   in response to the detecting inadequacy of the received GPS signal, using, at the mobile transceiver device, the speed data, the accelerometer data, the heading data, and a last GPS determined position to calculate a trial estimated position of the vehicle, wherein the trial estimated position is calculated by modeling variation of speed of the vehicle based on the accelerometer data to account for delay jitters, integrating the speed of the vehicle over predetermined time intervals, and incrementing a last dead-reckoning based position;

producing an estimated position of the vehicle for use in producing a navigation output, wherein the producing the estimated position of the vehicle comprises:

identifying a conflict between the trial estimated position and a predetermined route information, wherein the predetermined route information identifies a route to reach a predetermined navigation destination; and in response to the identifying the conflict, revising the trial estimated position to reach a predetermined navigation destination; and rendering a display of a map with the estimated position of the vehicle based on the revised trial estimated position of the vehicle.

2. The method of claim 1 further comprising repeatedly updating the estimated position based on a sequence of dead reckoning inputs received from the vehicle.

3. The method of claim 2, wherein the receiving of the dead reckoning inputs comprises receiving the dead reckoning inputs via a data processing system coupled to one or more vehicle sensors.

4. The method of claim 1, further comprising using the last GPS determined position of the mobile transceiver device as a starting point for providing the estimated position of the vehicle using dead reckoning.

5. The method of claim 1, wherein the dead reckoning inputs comprise an average speed during a time interval of a specified size, to estimate a distance traveled during that interval.

6. The method of claim 1, further comprising receiving the dead reckoning inputs as instantaneous speed measurements taken on a sampling schedule.

7. The method of claim 1, further comprising receiving the dead reckoning inputs while receiving GPS signals at the mobile transceiver device, and either determining a position of the mobile transceiver device based on the received GPS signals, or using the dead reckoning inputs when detecting GPS signal reception inadequate to update the position of the mobile transceiver device.

8. The method of claim 1, further comprising supplementing the dead reckoning inputs received from the vehicle with an input representing a condition sensed by the mobile transceiver device to produce the estimated position of the vehicle.

9. The method of claim 8, wherein the dead reckoning inputs received from the vehicle comprise speed information, and the condition sensed by the mobile transceiver device comprises a heading.

10. A mobile transceiver device, comprising:

a receiver module for receiving a plurality of signals from which a position can be determined, and for producing a navigation output based on the received plurality of signals, wherein the receiver module may fail to calculate a current position at times;

a microprocessor; and a memory storing code for configuring the microprocessor to receive, from the receiver module, the current calculated position, when available, and use the current calculated position in providing a navigation output through a user interface of the mobile transceiver device, and wirelessly receive, at the mobile transceiver device from a vehicle in which the mobile transceiver device is located, dead reckoning inputs, wherein the dead reckoning inputs include speed data, accelerometer data, and heading data of the vehicle, during one or more times when the receiver module fails to output the current position due to inadequacy of a received GPS signal;

in response to the detecting inadequacy of the received GPS signal, use the speed data, the accelerometer data, the heading data and a past determined position to calculate a trial estimated position of the vehicle, wherein the trial estimated position is calculated by modeling variation of speed of the vehicle based on the accelerometer data to account for delay jitters, integrating the speed of the vehicle over predetermined time intervals, and incrementing a last dead-reckoning based position;

produce an estimated position of the vehicle for use in producing a navigation output, wherein the producing the estimated position of the vehicle comprises:

identifying a conflict between the trial estimated position and a predetermined route information, wherein the predetermined route information identifies a route to reach a predetermined navigation destination; and in response to the identifying the conflict, revising the trial estimated position to reach a predetermined navigation destination; and render a display of a map with the estimated position of the vehicle based on the revised trial estimated position of the vehicle.

11. The mobile transceiver device of claim 10, wherein the receiver module comprises a Global Positioning System signal receiver module.

12. The mobile transceiver device of claim 10, wherein the code is further for configuring the microprocessor to receive the dead reckoning inputs at generally regular intervals and to responsively estimate the current position.

13. The mobile transceiver device of claim 10, wherein the code is further for configuring the microprocessor to use the last outputted current position from the receiver module as a starting position for dead reckoning navigation.

14. The mobile transceiver device of claim 10, wherein the interface comprises one or more of a Bluetooth link and a Universal Serial Bus link.

15. The mobile transceiver device of claim 10, wherein the code is for using dead reckoning data sensed by the mobile transceiver device in conjunction with the dead reckoning inputs received from the automobile data system.

16. A non-transitory computer readable medium storing computer executable code comprising code for programming a microprocessor located in a mobile transceiver device to:

dynamically switch from GPS-based navigation to dead reckoning navigation, during times when a position of the mobile transceiver device is not sufficiently determinable based on inadequacy of received GPS signals;

perform the dead reckoning navigation based at least on one or more inputs wirelessly received, by the mobile transceiver device, from a data system of a vehicle in which the mobile transceiver device is located;

produce a trial estimated position of vehicle based upon dead reckoning inputs received from the vehicle, wherein the dead reckoning inputs include speed data, accelerometer data, and heading data of the vehicle, and the trial estimated position is calculated by modeling variation of speed of the vehicle based on the accelerometer data to account for delay jitters, integrating the speed of the vehicle over predetermined time intervals, and incrementing a last dead-reckoning based position;

produce an estimated position of the vehicle for use in producing a navigation output, wherein producing the estimated position of the vehicle comprises:
  identifying a conflict between the trial estimated position and a predetermined route information, wherein the predetermined route information identifies a route to reach a predetermined navigation destination;
  in response to identifying the conflict, revising the trial estimated position to reach a predetermined navigation destination;
render a display of a map with the estimated position of the vehicle based on the revised trial estimated position of the vehicle; and
dynamically switch from dead reckoning based navigation to GPS-based navigation upon availability of an updated GPS-based position fix.

17. A method for providing navigation outputs from a mobile transceiver device, comprising:
  outputting, from a user interface of the mobile transceiver device, navigation information determined based on using a position determined using received GPS signals, when GPS signals are available;
  when received GPS signals are determined to be inadequate, outputting a trial estimated position of a vehicle based upon dead reckoning inputs wirelessly received, by the mobile transceiver device, from the vehicle, in which the mobile transceiver device is located, wherein the dead reckoning inputs include speed data, accelerometer data, and heading data of the vehicle, and the trial estimated position is calculated by modeling variation of speed of the vehicle based on the accelerometer data to account for delay jitters, integrating the speed of the vehicle over predetermined time intervals, and incrementing a last dead-reckoning based position;
  outputting an estimated position of the vehicle, wherein the estimated position of the vehicle is produced by:
    identifying a conflict between the trial estimated position and a predetermined route information, wherein the predetermined route information identifies a route to reach a predetermined navigation destination; and
    in response to the identifying the conflict, revising the trial estimated position to reach a predetermined navigation destination; and
  rendering a display of a map with the estimated position of the vehicle based on the revised trial estimated position of the vehicle.

* * * * *